United States Patent
Vance

(10) Patent No.: US 7,987,573 B2
(45) Date of Patent: Aug. 2, 2011

(54) COVER AND METHOD FOR CONTAINING OIL AND GREASE DISTRIBUTED FROM UNIVERSAL JOINT

(76) Inventor: Randal Eugene Vance, Valley Center, CA (US)

( * ) Notice: Subject to any disclaimer, the term of this patent is extended or adjusted under 35 U.S.C. 154(b) by 551 days.

(21) Appl. No.: 12/043,410

(22) Filed: Mar. 6, 2008

(65) Prior Publication Data

US 2009/0227383 A1 Sep. 10, 2009

(51) Int. Cl.
 *F16D 3/84* (2006.01)
(52) U.S. Cl. ............... 29/402.08; 150/154; 464/173
(58) Field of Classification Search .......... 464/173–175; 29/402.08, DIG. 79; 206/318; 150/154, 150/157; 277/315, 634–636
See application file for complete search history.

(56) References Cited

U.S. PATENT DOCUMENTS

| | | | |
|---|---|---|---|
| 2,405,541 A * | 8/1946 | Gerner | 29/402.08 X |
| 2,825,213 A | 3/1958 | Dunn | |
| 2,924,954 A | 2/1960 | Panhard | |
| 3,254,907 A * | 6/1966 | Imus | 464/175 X |
| 4,501,572 A | 2/1985 | Hook | |
| 4,568,313 A | 2/1986 | Diffenderfer | |
| 4,605,332 A | 8/1986 | Mayhew | |
| 4,663,984 A | 5/1987 | Taylor | |
| 4,747,804 A | 5/1988 | Benzi | |
| 5,273,490 A | 12/1993 | Stewart et al. | |
| 5,312,300 A | 5/1994 | McGregor et al. | |
| 5,655,662 A | 8/1997 | Garcia | |
| 5,870,931 A | 2/1999 | Frantz | |
| 6,264,568 B1 | 7/2001 | Frazer | |
| 6,368,224 B1 | 4/2002 | Knodle | |
| 6,926,612 B2 | 8/2005 | Wang et al. | |
| 2004/0204253 A1 | 10/2004 | Wohlschlegel | |

FOREIGN PATENT DOCUMENTS

| | | | |
|---|---|---|---|
| GB | 1 299 362 | * 12/1972 | ............ 464/173 |
| JP | 62-288727 | 12/1987 | |

OTHER PUBLICATIONS

4130 Products, CV Boot Replacement, Aug. 6, 2002 [online], [retrieved on Oct. 22, 2010] Retrieved from the Wayback Machine using Internet URL: http://web.archive.org/web/20020806033057/http://4130-productes.com/step/cvboot/index.htm.*
International Search Report and Written Opinion from related PCT/US09/36210 dated Oct. 19, 2009.

* cited by examiner

*Primary Examiner* — Gregory Binda
(74) *Attorney, Agent, or Firm* — Stephen C. Beuerle; Procopio Cory Hargreaves & Savitch LLP

(57) ABSTRACT

A method of covering and protecting a universal joint of a drive train including providing a flexible, removable universal joint cover including a removable, reusable outer flexible shell and a removable, flexible liner; applying the flexible, removable universal joint cover over the universal joint for rotation with the universal joint; collecting oil and grease distributed from the universal joint with the removable, flexible liner of the flexible, removable universal joint cover rotating with the universal joint; and protecting the universal joint from external elements with the removable, flexible liner of the flexible, universal joint cover. The flexible, removable universal joint cover catches the grease/oil that normally flies off of the universal joint and protects the universal joint from the external environment.

13 Claims, 4 Drawing Sheets

COVER AND METHOD FOR CONTAINING OIL AND GREASE DISTRIBUTED FROM UNIVERSAL JOINT

FIELD OF THE INVENTION

The present invention relates generally to protective covers for vehicle drive trains.

BACKGROUND OF THE INVENTION

Universal joints are used in vehicle drive trains of vehicles with extended wheelbases, primarily commercial vehicles, to connect multiple sections of a drive shaft. The universal joints are flexible joints that couple two drive shaft segments together to permit either segment to be positioned out of straight-line alignment with respect to the other and are usually exposed to the environment. Many universal joints require lubrication and have grease fittings to accommodate such lubrication. As the drive shaft spins at high speed, the grease/oil in the universal joint flies off of the universal joint from the centrifugal force of the spinning universal joint. This grease/oil covers roads and vehicle undercarriages with a greasy, oily film, which is then washed into the environment by snow, rain, and pressure washing and steam cleaning of the truck undercarriage. This greasy, oily film on the vehicle undercarriage makes it difficult to inspect the vehicle frame and vehicle components for cracks, wear, and loose bolts/fasteners.

SUMMARY

Accordingly, an aspect of the invention involves a flexible, removable universal joint cover that catches the grease/oil that normally flies off of the universal joint and protects the universal joint from the external environment. In one embodiment, the flexible, removable universal joint cover includes a removable liner that catches the grease/oil that normally flies off of the universal joint. The removable liner may be removed periodically, properly disposed of, and replaced by another removable liner (within the reusable outer cover). In another embodiment, the entire flexible, removable universal joint cover may be properly disposed of after each period of use.

Another aspect of the invention involves a method of covering and protecting a universal joint of a drive train. The method includes providing a flexible, removable universal joint cover including a removable, reusable outer flexible shell and a removable, flexible liner; applying the flexible, removable universal joint cover over the universal joint for rotation with the universal joint; collecting oil and grease distributed from the universal joint with the removable, flexible liner of the flexible, removable universal joint cover rotating with the universal joint; and protecting the universal joint from external elements with the removable, flexible liner of the flexible, removable universal joint cover.

In one more implementations of the aspect described immediately above, the method includes one or more of the following: applying the flexible, removable universal joint cover over the universal joint includes attaching the flexible, removable universal joint cover to the universal joint using one or more fastening mechanisms; the method further includes removing the flexible, removable universal joint cover from the universal joint; the method further includes replacing the removable, flexible liner that collected oil and grease distributed from the universal joint with a new, different removable, flexible liner in the removable, reusable outer flexible shell; and/or the method further includes re-attaching the flexible, removable universal joint cover with the new, different removable, flexible liner over the same universal joint.

A further aspect of the invention involves a flexible, removable universal joint cover for covering and protecting a universal joint of a drive train. The flexible, removable universal joint cover includes a removable, reusable outer flexible shell; one or more fastening mechanisms carried by the removable, reusable outer flexible shell for removably attaching the flexible, removable universal joint cover over the universal joint for rotation with the universal joint; and a removable, flexible liner removably attachable to the removable, reusable outer flexible shell, the removable, flexible liner configured to collect oil and grease distributed from the universal joint as the flexible, removable universal joint cover rotates with the universal joint and be replaced with a new, different removable, flexible liner.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5A is a cross-sectional view of the flexible, removable universal joint cover taken along lines 5A-5A of FIG. 5.

DETAILED DESCRIPTION

Figure 1:
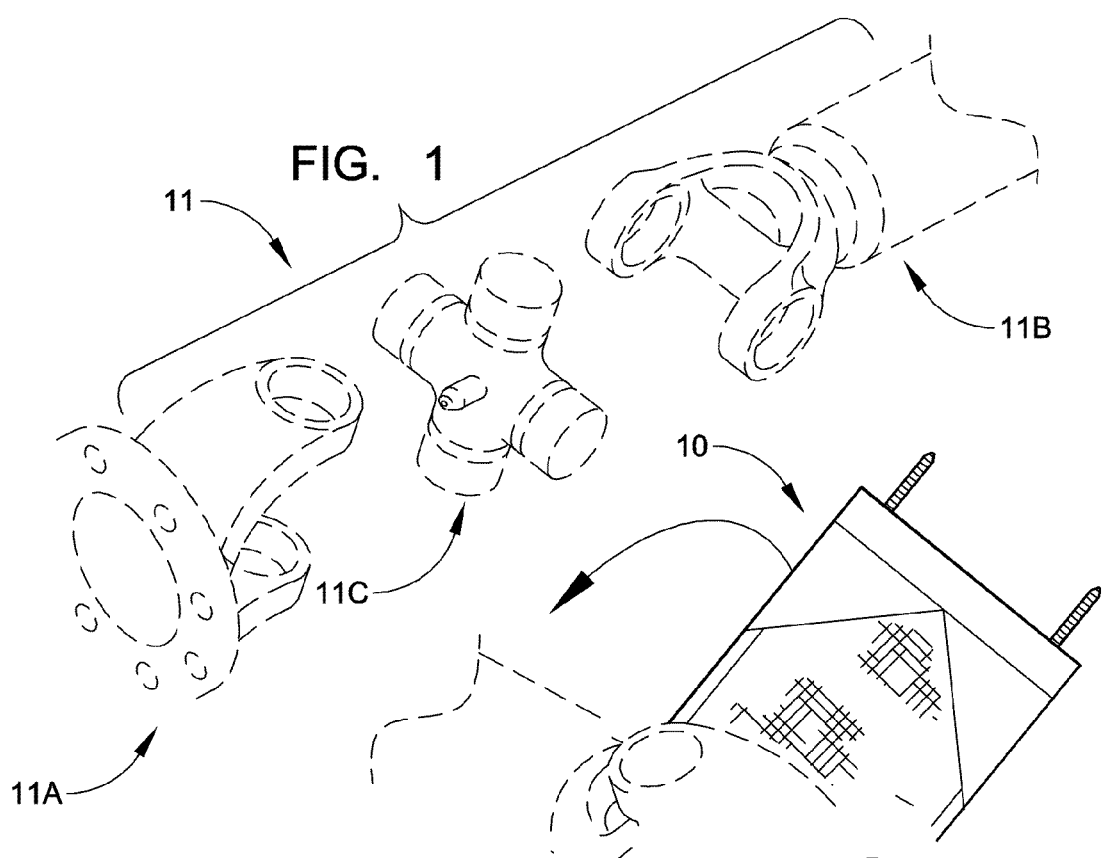
FIG. 1 is an exploded perspective view of an embodiment of a universal joint that a flexible, removable universal joint cover may be applied over.

With reference to FIGS. 1-6, an embodiment of a flexible, removable universal joint cover 10 for a universal joint 11 will be described. The embodiment of the universal joint 11 shown includes a flange yoke 11a at an end of one drive shaft segment that is coupled to a tube yoke 11b at an end of another drive shaft segment by a journal cross assembly 11c. In alternative embodiments, the flexible, removable universal joint cover 10 may be used with other types of universal joints other than the universal joint 11 shown and described herein. The flexible, removable universal joint cover 10 catches the grease/oil that normally flies off of the universal joint 11 and protects the universal joint 11 from the external environment. In further embodiments, the flexible, removable cover 10 may be used with other rotating parts of the drive train to catch grease/oil and protect the drive train, or the flexible, removable cover 10 may be used with other rotating parts to contain/protect the rotating parts.

The flexible, removable universal joint cover 10 includes a removable, reusable outer flexible shell 12 and a removable, replaceable flexible liner 14. In the embodiment shown, the outer flexible shell 12 has an elongated rectangular configuration and is made of rip-stop nylon, rubber, or some other durable type of water repellent or water proof fabric. The cover 10 includes one or more fastening mechanisms 15 to secure the cover 10 to the universal joint 11. The cover 10 is secured to the shoulders of the yokes and rotates with the universal joint 11. In the embodiment shown, the fastening mechanisms 15 include two plastic ties with male insertion sections 16 and female receiving sections 18 disposed in channels 19 (FIGS. 5, 5A), and Velcro® brand hook and loop fastener sections 20, 22. In alternative embodiments, one or more additional and/or alternative types of fastening mechanisms may be used such as, but with out limitation, circular clamps. The removable, reusable shell 12 includes four triangular pockets 21 formed by triangular flaps 24 and shell main body 25. Corners of the removable liner 14 are disposed within the pockets 21 to secure the liner 14 within the shell 12. In alternative embodiments, the shell 12 and/or the liner 14 may have alternative configurations and/or constructions for removably securing the removable liner 14 within the removable, reusable shell 12. Further, as indicated above, in an alternative embodiment, the liner 14 is not removable (i.e., shell 12 and liner 14 form a single-piece cover 10 that is disposed of after each use period). In a further embodiment, the flexible removable cover 10 does not have a liner 14.

Figure 6:
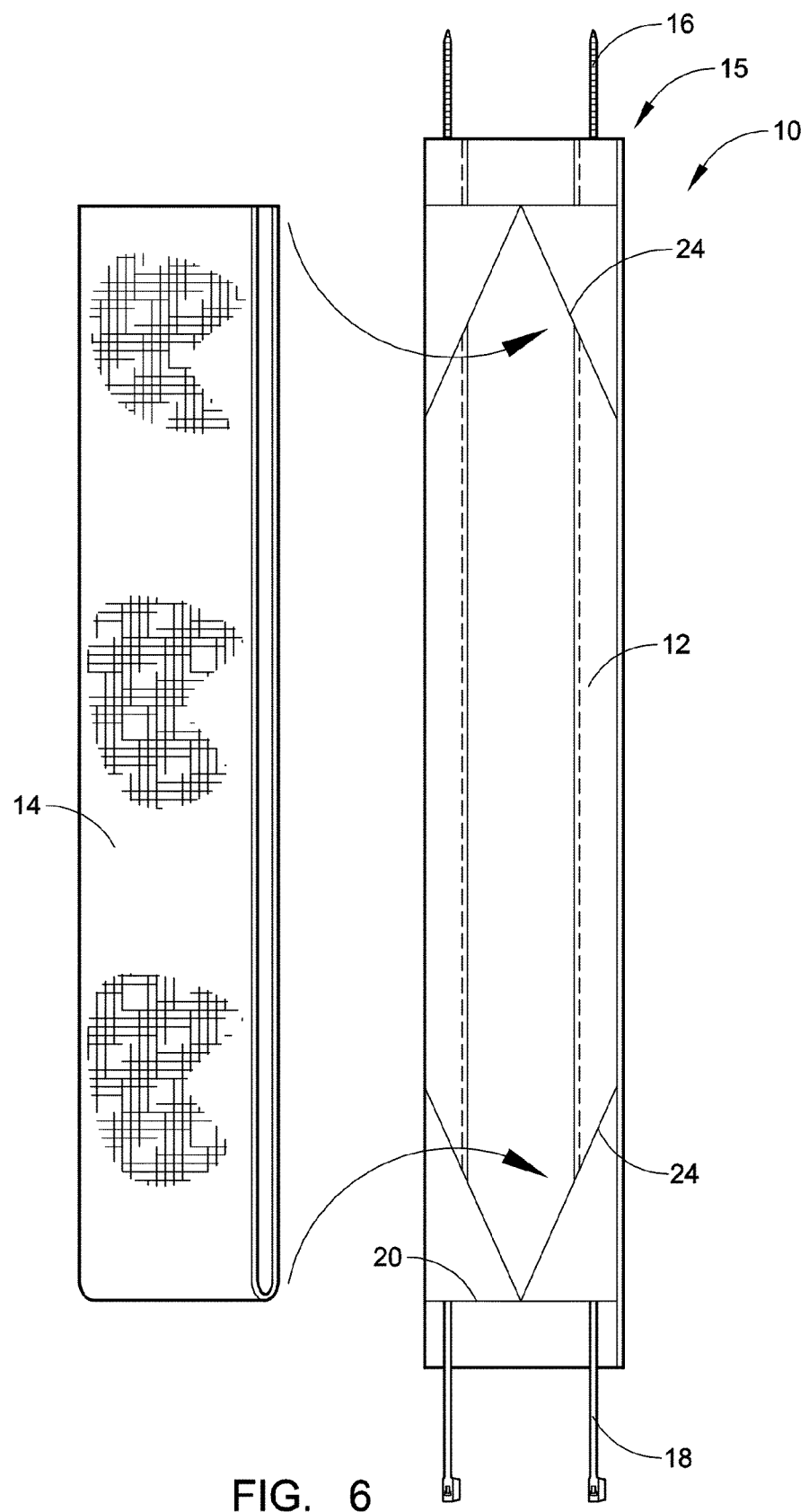
FIG. 6 is a bottom/inside plan view of the flexible, removable universal joint cover of FIG. 2 and shows an embodiment of a removable, replaceable liner of the flexible, removable universal joint cover.

As best shown in FIG. 6, in the embodiment shown, the removable, flexible liner 14 is a separate and replaceable oil and grease absorbing pad that is preferably changed at each service interval. The liner 14 is an elongated strip of absorbent material and may include multiple absorbent layers as shown. The strip of absorbent material may be one piece or folded back on itself. In alternative embodiments, the removable, flexible liner 14 may have an alternative configuration and/or construction from that shown or described. Further, the removable, flexible liner 14 is water repellant/resistant and may be chemically treated so as to have a desired reaction with the oil/grease.

Figure 2:
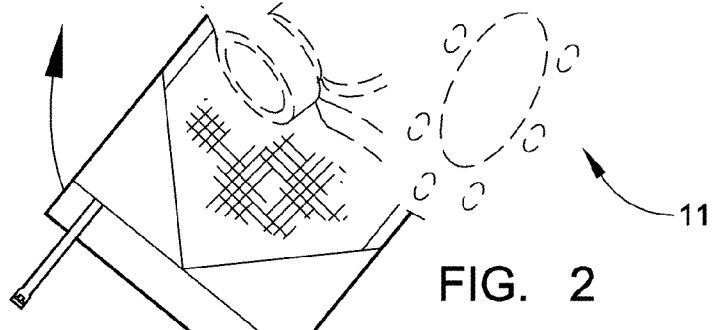
FIG. 2 is a perspective view of the universal joint in FIG. 1, and shows an embodiment of the flexible, removable universal joint cover being applied over the universal joint.
Figure 3:
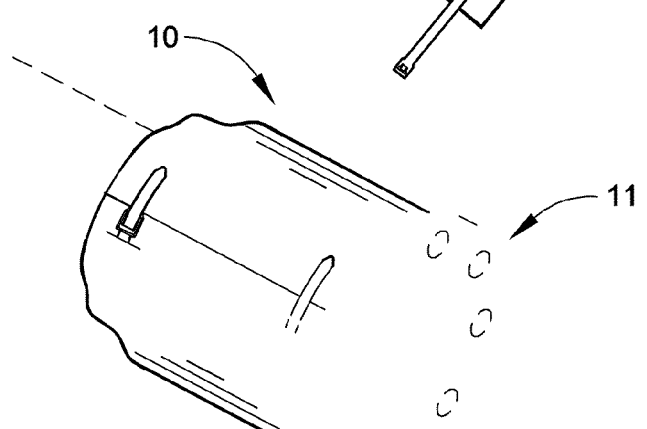
FIG. 3 is a perspective view of the flexible, removable universal joint cover of FIG. 2 applied over the universal joint.
Figure 4:
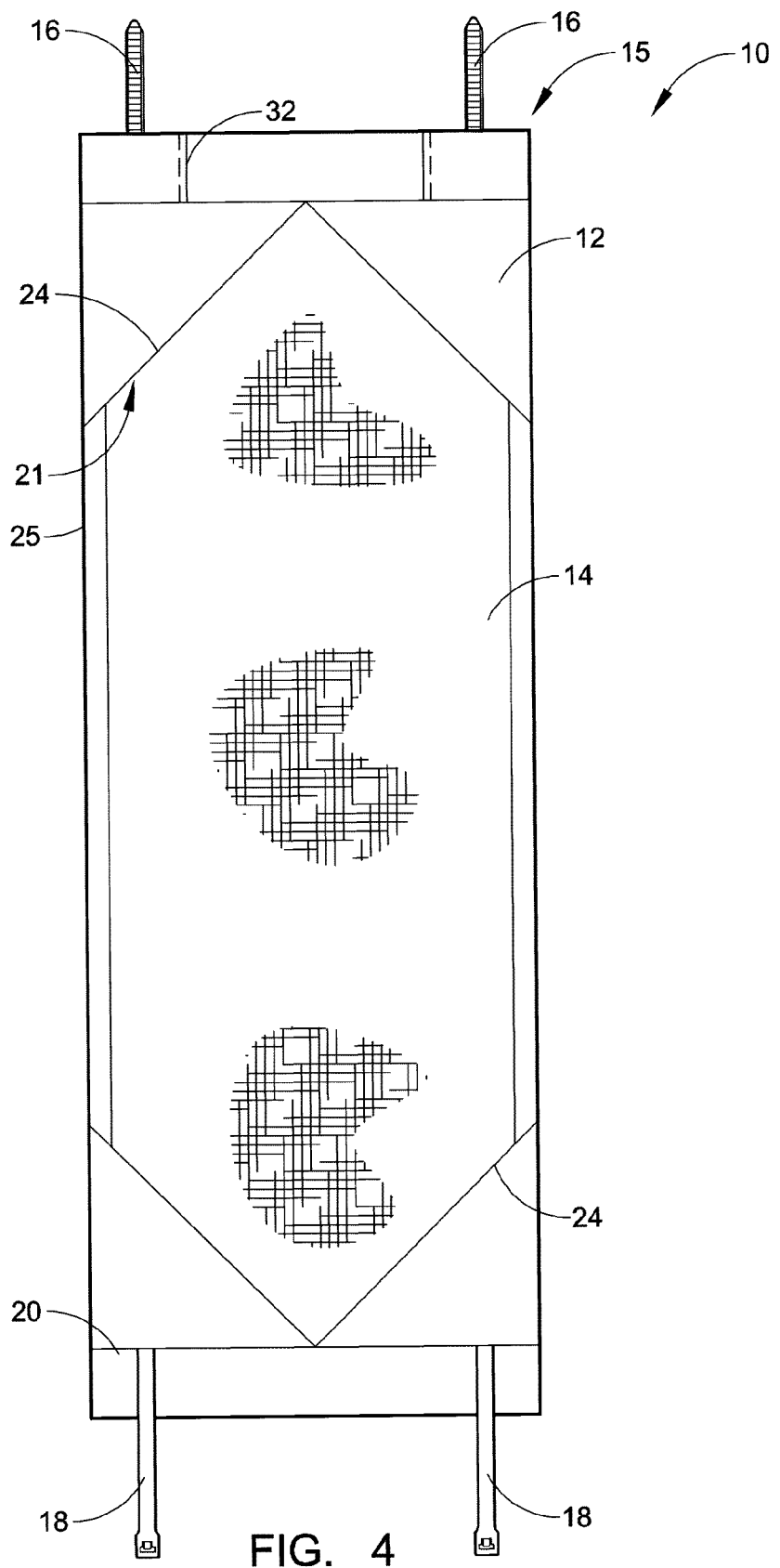
FIG. 4 is a bottom/inside plan view of the flexible, removable universal joint cover of FIG. 2.
Figure 5:
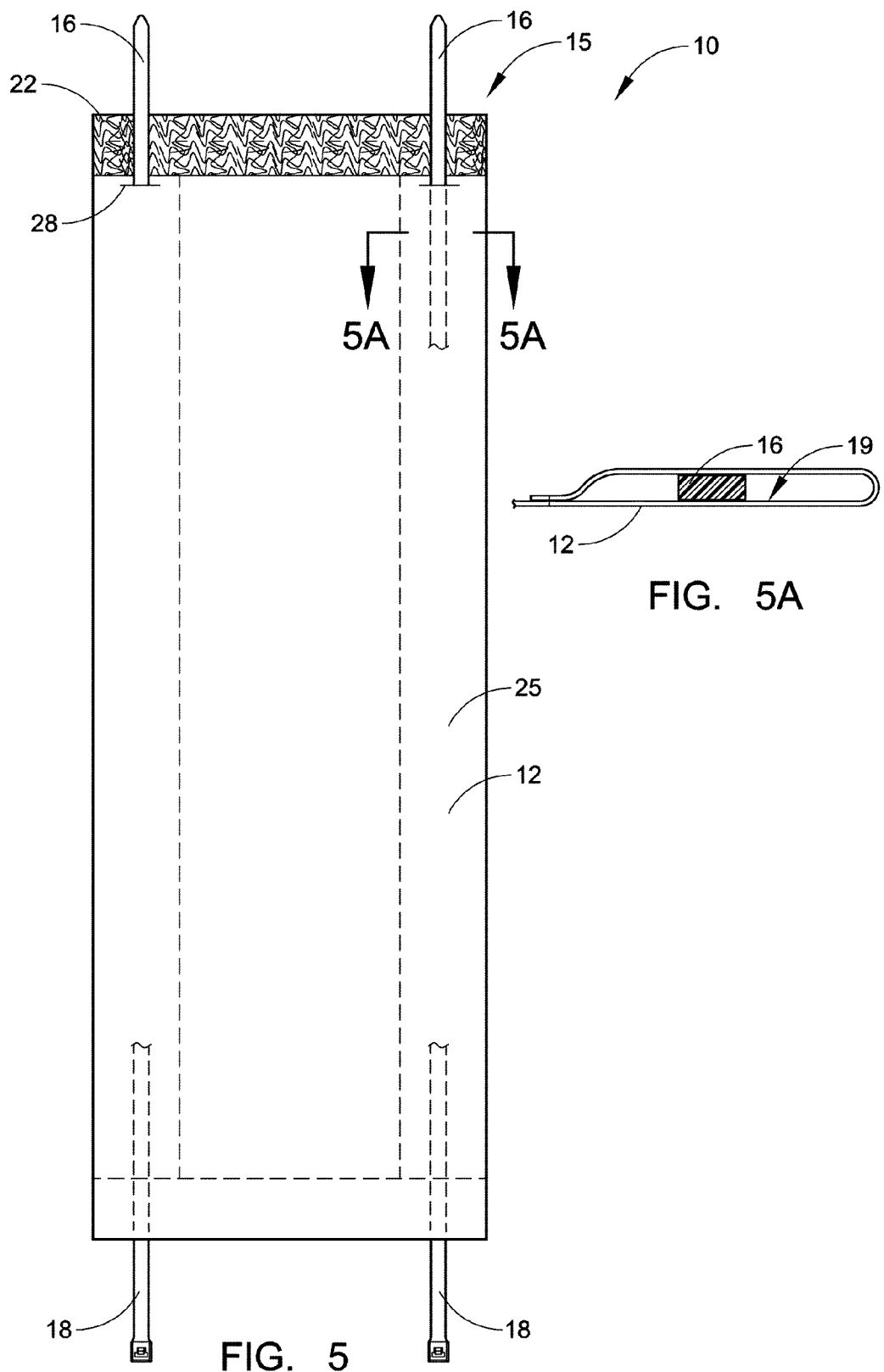
FIG. 5 is a top/outside plan view of the flexible, removable universal joint cover of FIG. 2.

In use, the flexible, removable universal joint cover 10 is applied over and wrapped around the universal joint 11 as shown in FIGS. 2 and 3. The one more fastening mechanisms 15 are fastened to secure the cover 10 to the universal joint 11. For example, the hook and loop fastener sections 20, 22 are attached, and then the male insertion sections 16 of the ties are inserted into and secured by the female receiving sections 18. With the flexible, removable universal joint cover 10 applied over the universal joint 11, the centrifugal force of the spinning universal joint 11 causes grease and oil to be caught and trapped by the interior, flexible, removable liner 14 of the cover 10. Also, the outer shell 12 of the cover 10 protects the universal joint 11 from water, salt, and other environmental factors.

During service of the vehicle, the cover 10 is removed from the universal joint 11, for example, by cutting or unfastening the ties and unfastening the brand hook and loop fastener sections 20, 22. The soiled interior, flexible, removable liner 14 is removed from the pockets 21 of the removable, reusable shell 12 and properly disposed of. The old liner 14 is replaced with a new, different, clean, interior, flexible, removable liner 14 by inserting the corners of the new liner 14 into the pockets 21 so that the liner 14 is removably secured within the same removable, reusable shell 12. The universal joint 10 may be checked and/or lubricated, and/or other service performed on the vehicle. Then, the cover 10 is then re-applied to the universal joint 11 in the same manner as that described above for applying the cover 10 to the universal joint 11. If plastic ties were used, new plastic ties may be inserted through the channels 19 and the cover 10 is applied to the universal joint 11 as described above.

Accordingly, the flexible, removable universal joint cover catches the oil/grease that normally flies off of the universal joint and protects the universal joint from the external environment. The flexible, removable universal joint cover is quickly and easily applied to the universal joint, removed for changing the removable liner, and re-applied to the universal joint using the same removable, reusable shell. By capturing the oil/grease that flies off the universal joint and allowing this oil/grease to be properly disposed of, the flexible, removable universal joint cover can eliminate much of the grease/oil that covers the roads is washed into the environment by snow and rain.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method of containing oil and grease distributed from a universal joint of a drive train, comprising:
   providing a universal joint cover including a shell, and one or more fastening mechanisms carried by the shell for attaching the shell over the universal joint, the shell being a removable, reusable outer flexible shell and the universal joint cover further including a removable, flexible liner removably attachable to the flexible shell;
   applying the universal joint cover over the universal joint so that both the shell and the liner are simultaneously applied over the universal joint;
   collecting oil and grease distributed from the universal joint with the universal joint cover;
   removing the universal joint cover so that both the shell and the liner are simultaneously removed from the universal joint;
   removing the liner from the shell;
   replacing the liner with another new removable, flexible liner;
   inserting the liner into the shell;
   applying the universal joint cover over the universal joint so that both the shell and the liner are simultaneously applied over the universal joint.

2. The method of claim 1, wherein the universal joint cover is disposed of after a period of use.

3. The method of claim 1, wherein the universal joint cover rotates with the universal joint and collects oil and grease distributed from the universal joint as the universal joint cover rotates with the universal joint.

4. The method of claim 1, wherein the liner is an absorbent material that is water repellant and resistant, and is chemically treated to capture oil and grease.

5. A method of containing oil and grease distributed from a universal joint of a drive train, comprising:
   providing a universal joint cover including a shell, and one or more fastening mechanisms carried by the shell for attaching the shell over the universal joint, the shell being a removable, reusable outer flexible shell with pockets and the universal joint cover further including a removable, flexible liner removably attachable in the pockets of the flexible shell;

applying the universal joint cover over the universal joint so that both the shell and the liner are simultaneously applied over the universal joint;

collecting oil and grease distributed from the universal joint with the universal joint cover;

removing the universal joint cover so that both the shell and the liner are simultaneously removed from the universal joint;

removing the liner from the pockets of the shell;

replacing the liner with another new removable, flexible liner;

inserting the liner into the pockets of the shell;

applying the universal joint cover over the universal joint so that both the shell and the liner are simultaneously applied over the universal joint.

6. The method of claim 5, wherein the universal joint cover is disposed of after a period of use.

7. The method of claim 5, wherein the universal joint cover rotates with the universal joint and collects oil and grease distributed from the universal joint as the universal joint cover rotates with the universal joint.

8. The method of claim 5, wherein the universal joint cover is disposed of after a period of use.

9. The method of claim 5, wherein the liner is an absorbent material that is water repellant and resistant, and is chemically treated to capture oil and grease.

10. A method of containing oil and grease distributed from a universal joint of a drive train, comprising:

providing a universal joint cover including a shell, and one or more fastening mechanisms carried by the shell for attaching the shell over the universal joint, the shell being a removable, reusable outer flexible shell and the universal joint cover further including a removable, flexible liner that is removably attachable to the flexible shell, is an absorbent material that is water repellant and resistant, and is chemically treated to capture oil and grease;

applying the universal joint cover over the universal joint so that both the shell and the liner are simultaneously applied over the universal joint;

collecting oil and grease distributed from the universal joint with the liner of the universal joint cover;

removing the universal joint cover so that both the shell and the liner are simultaneously removed from the universal joint;

removing the liner from the shell;

replacing the liner with another new removable, flexible liner that is water repellant and resistant, and is chemically treated to capture oil and grease;

attaching the liner to the shell;

applying the universal joint cover over the universal joint so that both the shell and the liner are simultaneously applied over the universal joint.

11. The method of claim 10, wherein the universal joint cover is disposed of after a period of use.

12. The method of claim 10, wherein the universal joint cover rotates with the universal joint and collects oil and grease distributed from the universal joint as the universal joint cover rotates with the universal joint.

13. The method of claim 10, wherein the universal joint cover is disposed of after a period of use.

* * * * *